United States Patent [19]

Costello et al.

[11] Patent Number: 4,612,501

[45] Date of Patent: Sep. 16, 1986

[54] SELF-ADJUSTING MAGNETIC SENSOR

[75] Inventors: Scott M. Costello, Dearborn; William J. Vukovich, Ypsilanti, both of Mich.

[73] Assignee: General Motors Corporation, Detroit, Mich.

[21] Appl. No.: 634,600

[22] Filed: Jul. 26, 1984

[51] Int. Cl.⁴ .......................... G01B 7/14; G01P 3/42; G01P 1/00; F16B 21/18

[52] U.S. Cl. .................................. 324/208; 324/160; 324/262; 411/349; 411/525

[58] Field of Search ............... 324/207, 208, 160–180, 324/262; 403/372, 365, 326; 411/349, 521, 549, 525, 528; 215/201, 214

[56] References Cited

U.S. PATENT DOCUMENTS

| Re. 30,801 | 11/1981 | Gley | 411/349 |
|---|---|---|---|
| 2,712,262 | 7/1955 | Knohl | 411/521 |
| 3,220,078 | 11/1965 | Preziosi | 411/349 |
| 3,320,846 | 5/1967 | Orain | 411/521 |
| 3,793,545 | 2/1974 | Leiber et al. | 324/174 X |
| 4,020,965 | 5/1977 | Northup | 215/214 X |
| 4,066,949 | 1/1978 | Condrac | 324/207 X |
| 4,201,172 | 5/1980 | Jäggle et al. | 403/372 X |
| 4,337,869 | 7/1982 | Guinle | 215/201 |
| 4,346,809 | 8/1982 | Kusz | 215/214 |
| 4,543,988 | 10/1985 | Huveteau | 411/521 X |

Primary Examiner—Gerard R. Strecker
Assistant Examiner—Warren S. Edmonds
Attorney, Agent, or Firm—Donald F. Scherer

[57] ABSTRACT

A sensing mechanism has a retainer ring which is secured in an aperture formed in a housing in which the sensor is to operate. The retainer ring has a plurality of tabs which cooperate with axial and circumferential slots on the sensor to permit removal and replacement of the sensor without the need for adjustment. On original installation of the sensing mechanism, the retainer ring is positioned in the housing aperture by radially extending tines cooperating with the aperture. A resilient member permits the mechanism to be installed to a depth deeper than the operating depth. The resilient member urges the sensor axially, as permitted by a gap between the retainer ring and the circumferential slots, to achieve the proper operating depth.

2 Claims, 9 Drawing Figures

SELF-ADJUSTING MAGNETIC SENSOR

This invention relates to sensor mechanisms and more particularly to sensor mechanisms that are self-adjusting and removable.

It is an object of this invention to provide an improved sensing mechanism wherein the sensor portion of the mechanism is self-adjusted at original assembly.

It is another object of this invention to provide an improved sensing mechanism wherein the sensor portion of the mechanism is automatically adjusted at original assembly and is also removable and replaceable to the original position without adjustment.

It is a further object of this invention to provide an improved sensing mechanism wherein the sensor, during assembly of the mechanism, is placed in contact with the member to be sensed, and held a predetermined distance therefrom by a tined retainer and a resilient member.

These and other objects and advantages of the present invention will be more apparant from the following description and drawings in which.

Figure 1:
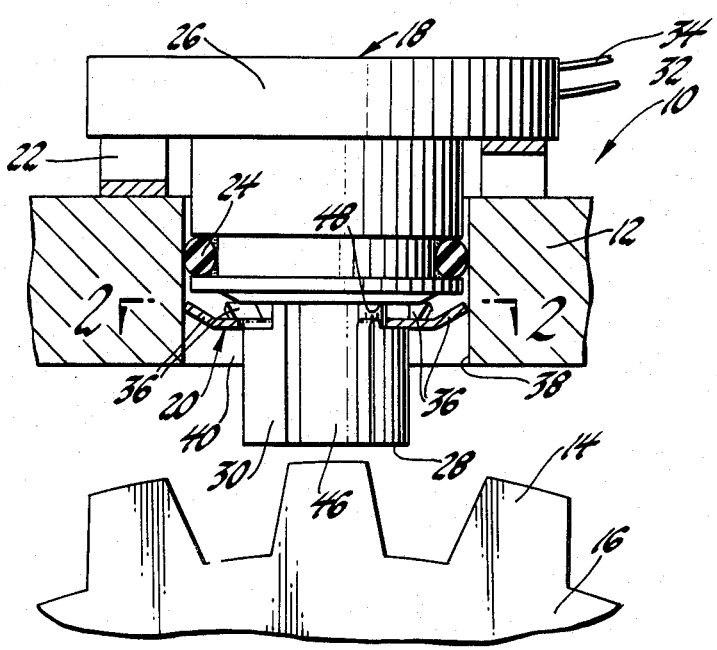
FIG. 1 is an elevational view, partly in section, of the sensor assembly in the working environment.
Figure 2:
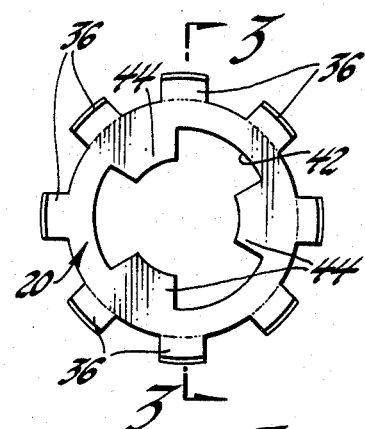
FIG. 2 is a top view of the retaining ring.
Figure 3:
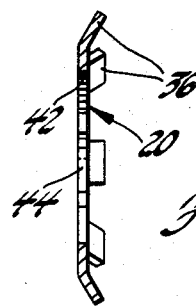
FIG. 3 is a sectional view taken along line 3—3 of FIG. 2.

Referring now to the drawings, wherein like characters represent the same or corresponding parts throughout the several views, there is seen in FIG. 1 a sensing mechanism, generally designated 10, which is disposed in a housing 12 adjacent the teeth 14 of a gear 16. The sensing mechanism 10 includes a sensor assembly 18, a retainer ring 20, a wave spring 22 and a resilient O-ring seal 24.

The sensor assembly 18 has a main body portion 26 and a sensor portion 28, disposed in a cylindrical portion 30, extending axially from the main body portion 26. The sensor 28 is preferably magnetic and is operable to cause the difference in the electrical signals carried by electrical lines 32 and 34 secured in the main body 26. The sensor portion 28 is responsive to the passage of teeth 14 formed on the gear 16. As is well-known, by counting the number of teeth passing the sensor in a given time and dividing that value by the number of teeth formed on the gear 16 an accurate measure of revolutions per unit time can be attained.

The retainer ring 20 has a plurality of radially extending tines or fingers 36 which engage the surface 38 of an aperture 40 formed in the housing 12. The tines 36 will maintain the retainer ring 20 in a fixed position within the aperture in housing 12 after the original assembly position is attained. The retainer ring 20 has a central aperture 42 and a plurality of radially inwardly extending tab members 44.

The cylindrical portion 30 has a plurality of axially extending slots 46. One end of each slot 46 terminates in an opening at the bottom of the sensor assembly and the other end of each slot 46 terminates at a circumferentially extending gap or slot 48. Each slot 46 is of sufficient width to permit the sensor assembly 18 to be inserted axially along the tabs 44 and the slot 48 is of a thickness greater than the width of the retainer ring 20.

Figure 4:
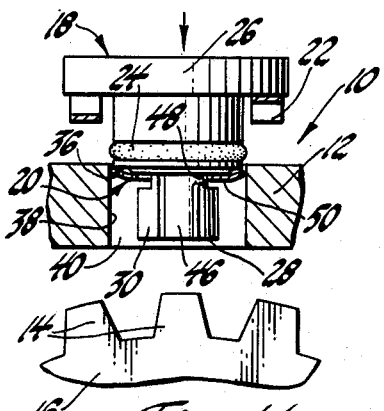
FIGS. 4 through 9 show the sensor assembly in various phases of insertion and removal.
Figure 5:
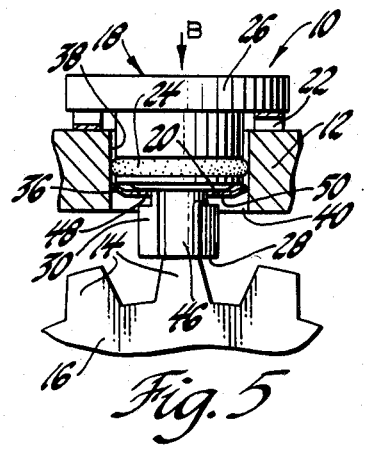
Figure 6:
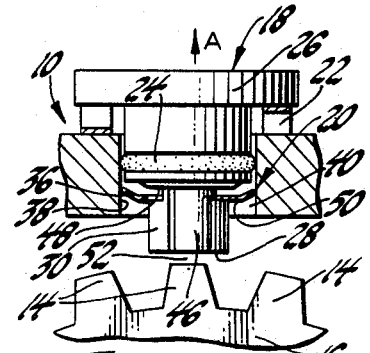
Figure 7:
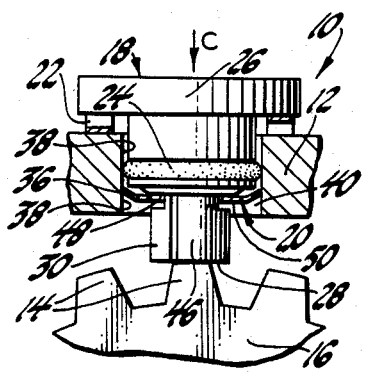
Figure 8:
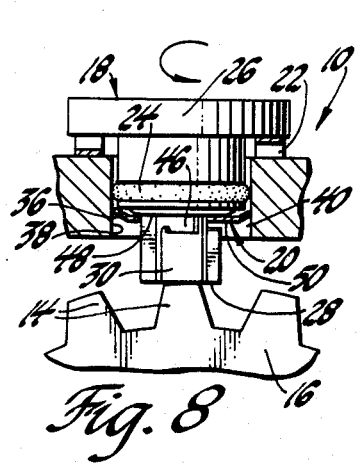
Figure 9:
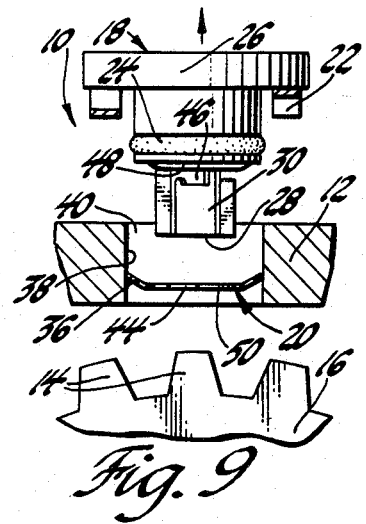

FIGS. 4 through 6 show the sensing mechanism 10 being assembled into the housing 12. FIGS. 7 through 9 show the sensor assembly 18 being removed from the housing 12 while the retainer ring 20 remains in the aperture 40 of the housing 12 at the assembled location. In FIG. 5, it can be seen that the retainer ring 20 is abutting the upper surface of each slot 48 while the sensor 28 is in contact with a tooth 14. It should be noted that a gap 50 exists between the lower surface of each slot 48 and the bottom surface of the retainer ring 20. Also, at this position, the wave spring 22 has been compressed and urges the sensor assembly 18 upward in the direction of Arrow A in FIG. 6.

As seen in FIG. 6, the assembly force represented by Arrow B in FIG. 5, has been removed so that the wave spring can move the sensor assembly 18 out of contact with the tooth 14. The gap 52 between the tooth 14 and the sensor 28 is equal to the gap 50 shown in FIG. 5. During operation, the sensor assembly 18 will remain spaced a distance equal to the gap 52 from the teeth 14 of the gear 16.

Should it become necessary to remove the sensor assembly 18, a force C is applied, as seen in FIG. 7, to depress the assembly 18 toward the gear 16 by compressing the spring 22. The assembly 18 is then rotated as seen in FIG. 8 until the axial slots 46 are aligned with the tabs 44 of retainer ring 20. When this alignment occurs, the assembly 18 can be withdrawn from the aperture 40 while the retainer ring 20 remains in the assembled position as shown in FIG. 9. By reversing the procedure of FIGS. 7 through 9, the assembly 18 can be reinstalled at its original position in the housing 12.

It will be appreciated from the above discussion that the sensing mechanism is self-adjusting at original assembly, that is, the sensor gap is properly set. Also the sensor may be removed and replaced without the need of adjustment during each replacement. It should be further appreciated that the manufacturing tolerances of the slots 48 and the thickness of retainer ring 20 will permit a new sensor to replace a used or inoperable sensor without affecting the operability of the system since the gap 52 will not vary significantly from one sensor assembly to another.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A self-adjusting sensing mechanism for use in a relatively stationary housing having an aperture and being held in close proximity to a device to be sensed, disposed in the housing, said mechanism comprising; a retainer ring of predetermined thickness having a central aperture with radially inwardly extending tab means and a plurality of tine means on the outer periphery thereof for engaging the aperture surface during assembly of said mechanism; sensor means having a cylindrical axial extension with axially extending slot means thereon alignable with said tab means for permitting insertion of said sensor means into said retainer ring, and circumferentially extending slot means of a predetermined width which is greater than the thickness of said retainer ring and being alignable with said tab means for permitting rotation of said sensor means relative to said retainer ring to limit the axial movement of the sensor means relative to the retainer ring to an amount equal to the difference between the predetermined width and said predetermined thickness, said sensor means and said retainer ring being inserted in said aperture simultaneously until said sensor means contacts said device; and resilient means for urging said sensor means toward removal from the retainer ring, said circumferential slot means and said tab means preventing removal when said sensor is rotated to misalign said tab means and said axial slot means, said sensor being spaced from said device by said resilient means the amount equal to the difference between said predetermined thickness and said predetermined width.

2. A self-adjusting sensing mechanism for use in a relatively stationary housing having an aperture and being held in close proximity to a device to be sensed, disposed in the housing, said mechanism comprising; a retainer ring of predetermined thickness having a central aperture with radially inwardly extending tab means and a plurality of tine means on the outer periphery thereof for engaging the aperture surface during assembly of said mechanism; sensor means having a cylindrical axial extension with axially extending slot means thereon alignable with said tab means for permitting insertion of said sensor means into said retainer ring in an axial direction, and circumferentially extending slot means of a predetermined width which is greater than the thickness of said retainer ring and being alignable with said tab means for permitting rotation of said sensor means relative to said retainer ring to limit the axial movement of the sensor means relative to the retainer ring to an amount not greater than the difference between the predetermined width of the circumferential slot and said predetermined thickness of said retainer ring; and wave spring means for urging said sensor means axially toward removal from the retainer ring, said circumferential slot means and said tab means preventing removal when said sensor is rotated to misalign said tab means and said axial slot means, said sensor means and said retainer ring being inserted in said aperture simultaneously until said sensor means contacts said device, said sensor being spaced from said device by said resilient means the amount equal to the difference between said predetermined thickness and said predetermined width.

* * * * *